United States Patent [19]
Yasukawa

[11] Patent Number: 6,085,040
[45] Date of Patent: Jul. 4, 2000

[54] APPARATUS AND METHOD FOR CONTROLLING AN AMOUNT OF LIGHT EMITTED BY AN ELECTRONIC FLASH DEVICE

[75] Inventor: Seiichi Yasukawa, Chiba, Japan

[73] Assignee: Nikon Corporation, Tokyo, Japan

[21] Appl. No.: 09/170,347

[22] Filed: Oct. 13, 1998

[30] Foreign Application Priority Data

Oct. 17, 1997 [JP] Japan ..................................... 9-285541

[51] Int. Cl.⁷ .................................................. G03B 15/05
[52] U.S. Cl. ............................................ 396/61; 396/159
[58] Field of Search ............................... 396/61, 159, 161

[56] References Cited

U.S. PATENT DOCUMENTS 5,729,772  3/1998  Sato et al. ............................... 396/159

*Primary Examiner*—W. B. Perkey
*Attorney, Agent, or Firm*—Erik B. Cherdak & Associates, LLC

[57] ABSTRACT

Apparatus and method for regulating and controlling the amount of light emitted by a flash unit for use with an imaging device. The apparatus and method include and involve a light source configured to illuminate a subject to imaged by an imaging device, a light receiving element configured to receive light emitted by the light source and reflected by the subject, and to generate a signal based on the reflected light, a light amount determination unit coupled to the light receiving element and configured to determine an amount of reflected light received by the light receiving element based on the signal, a light amount comparison unit coupled to the light amount determination unit and configured to compare the amount of reflected light determined by the light amount determination unit with a threshold value to generate a corresponding control signal, and a light source regulator coupled to the light amount comparison unit. The light source regulator includes a range detector configured to detect a distance to the subject, and a guide number setting unit configured to calculate at least one guide number based on that distance and an operating parameter related to the imaging device. The calculated guide number(s) correspond to an amount of time light is to be emitted by the light source during an imaging operation. The light source regulator controls the emission of light by the light source based on the control signal and the calculated guide number(s).

30 Claims, 12 Drawing Sheets

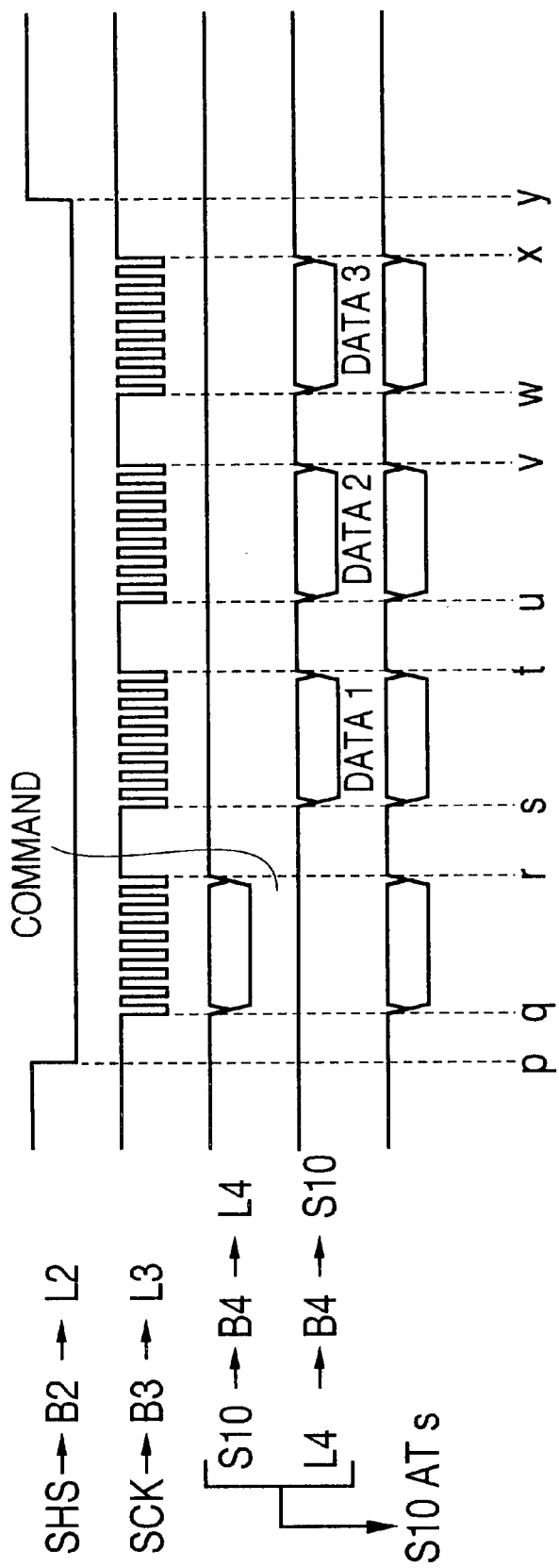

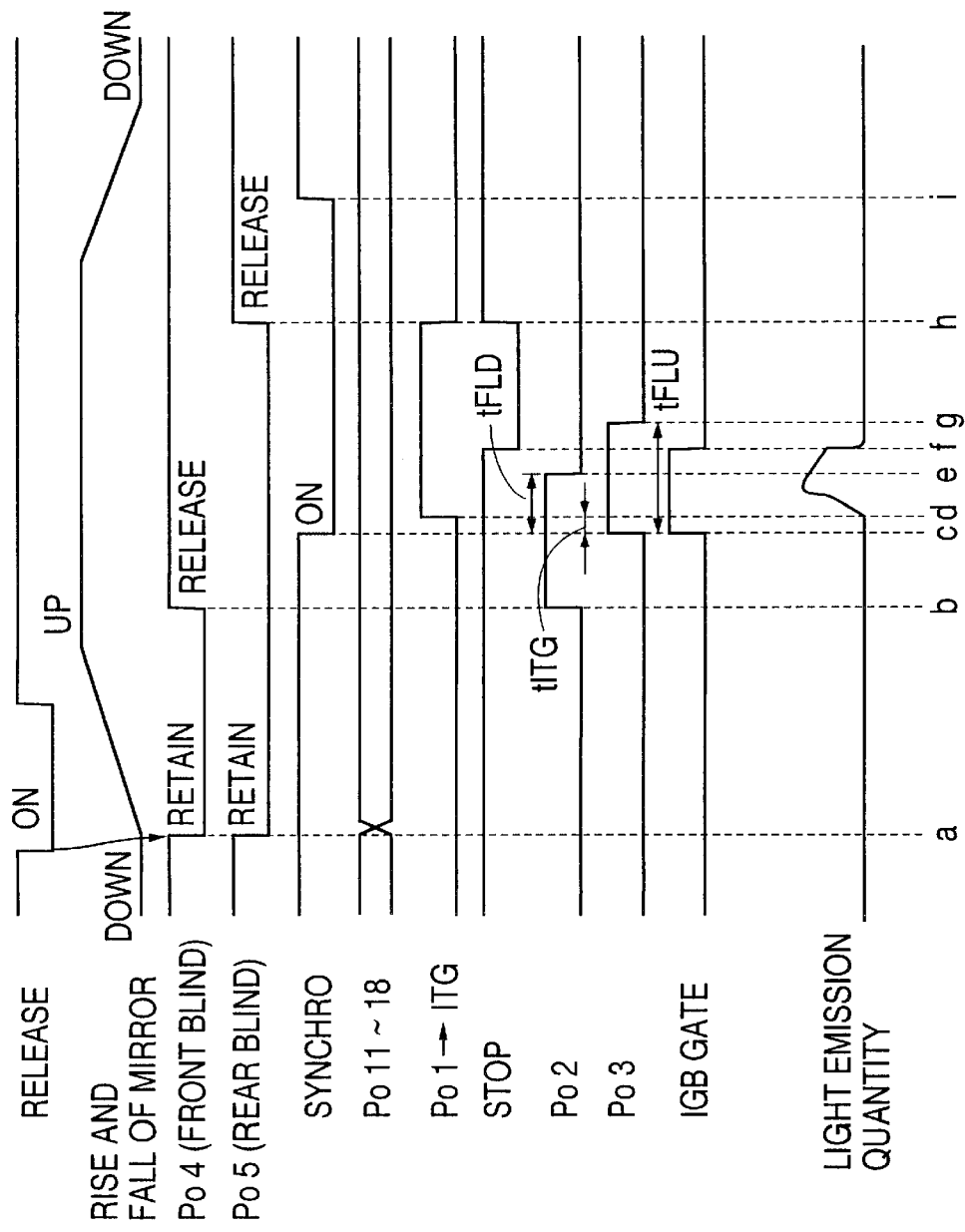

FIG. 9

| A | B | C |
|---|---|---|
| DATA NUMBER | GUIDE NUMBER VALUE WHICH REPRESENTS DATA | FLASH TIME [μsec] |
| 1 | 0.4 | 10 |
| 2 | 0.9 | 20 |
| 3 | 1.5 | 30 |
| 4 | 2.9 | 40 |
| 5 | 4.1 | 50 |
| 6 | 5.7 | 60 |
| 7 | 7.4 | 70 |
| 8 | 9.2 | 80 |
| 9 | 11.2 | 90 |
| 10 | 12.2 | 100 |
| 11 | 13.0 | 150 |
| 12 | 14.2 | 200 |
| 13 | 14.9 | 250 |
| 14 | 15.4 | 300 |
| 15 | 16.0 | 350 |
| 16 | 16.4 | 400 |
| 17 | 16.7 | 500 |
| 18 | 16.9 | 600 |
| 19 | 17.0 | 700 |
| 20 | 17.1 | 800 |

FIG. 10

| A | B | C |
|---|---|---|
| DATA NUMBER | GUIDE NUMBER VALUE WHICH REPRESENTS DATA | FLASH TIME [μsec] |
| 1 | 0.33 | 10 |
| 2 | 0.73 | 20 |
| 3 | 1.24 | 30 |
| 4 | 2.40 | 40 |
| 5 | 3.39 | 50 |
| 6 | 4.71 | 60 |
| 7 | 6.12 | 70 |
| 8 | 7.60 | 80 |
| 9 | 9.25 | 90 |
| 10 | 10.08 | 100 |
| 11 | 10.74 | 150 |
| 12 | 11.73 | 200 |
| 13 | 12.31 | 250 |
| 14 | 12.73 | 300 |
| 15 | 13.23 | 350 |
| 16 | 13.55 | 400 |
| 17 | 13.80 | 500 |
| 18 | 13.97 | 600 |
| 19 | 14.05 | 700 |
| 20 | 14.13 | 800 |

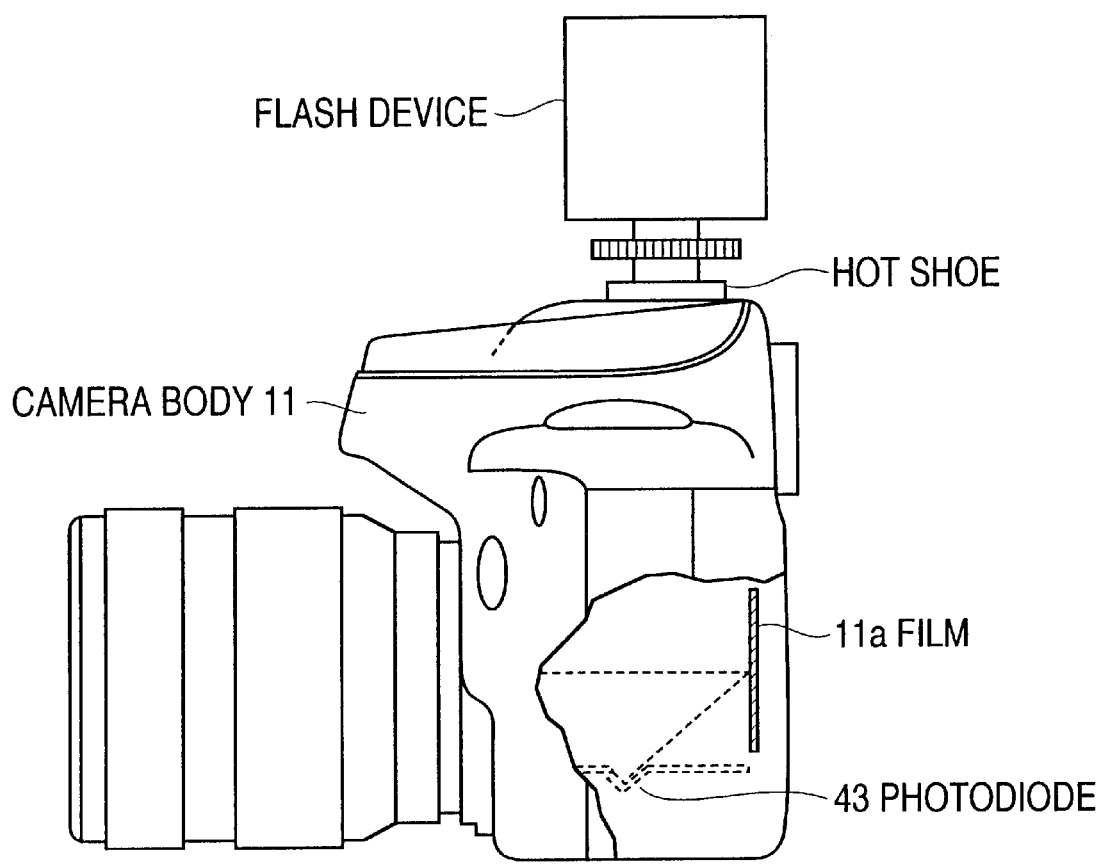

APPARATUS AND METHOD FOR CONTROLLING AN AMOUNT OF LIGHT EMITTED BY AN ELECTRONIC FLASH DEVICE

BACKGROUND OF THE INVENTION

1. Field of the Invention

The present invention relates to electron flash units used with cameras and other imaging devices. More particularly, the present invention relates to systems and methods used to regulate the amount of light emitted by such flash units.

2. Description of the Related Art

Electronic flash units for use with cameras and imaging devices are well known, Also well known, are systems and methods for controlling and regulating the amount of light that is emitted by such electronic flash units. For example, two popular systems and corresponding methods for controlling and regulating light emission are known as the "automatic light regulating method" and the "flashmatic method."

In the case of the automatic light regulating method, light emission of an electronic flash device is stopped at a point in time during imaging operations when an amount of light reflected by a subject/scene to be imaged/photographed has reached a threshold amount (as realized by a sensor within a flash unit, in a camera, etc.). Because the amount of reflected light usually is predictable, it is possible to perform flash photography, for example, based on a standardized amount of flash illumination. As such, the automatic light regulating method has made it is so possible to emit an amount of flash illumination independently of subject range, camera settings such as aperture value, etc.

In the case of the flashmatic method, the amount of light emitted by an electronic flash device is adjusted based on the calculation of a "guide number." Such a guide number, in turn, may be used to control the start and stop times associated with flash illumination during an imaging operation. For example, the following equation has been used to calculate guide numbers (GN) for use in flash illumination regulation and control:

$$GN = R \times F \quad (3)$$

In equation (3), R is the photographic range such as the illumination range from an electronic flash device to a subject/scene to be imaged. F is the aperture value of a camera, for example.

As such, using a standard guide number $GN_{Sv5}$ at a film sensitivity Sv5 (ISO 100 equivalent, etc.), equation (3) is as follows:

$$GN_{Sv5} = R \times F \times 2^{(SV5)/2} \quad (4)$$

Accordingly, a subject at a distance or a range R can be illuminated with the appropriate amount of illuminating light by adjusting the flash time of an electronic flash device to correspond to guide number GN as found from evaluation of equations (3) and (4).

With the flashmatic method as described above, the amount of illuminating light emitted by an electronic flash device is controlled and regulated without the effects of subject/scene reflectivity, etc. Accordingly, a relatively bright subject or a relatively dark subject usually can be photographed/imaged without realizing "gray" images.

Unfortunately, the aforementioned methods for regulating flash illumination have shortcomings which have not heretofore been adequately addressed by prior regulation systems. For example, the automatic light regulating method often results in images that are gray in appearance, especially when used to regulate light emission relative to scenes that either are very bright (e.g., scenes where reflection is high) or very dark (e.g., scenes where reflection is low), Accordingly, if a relatively large amount of light is reflected back to a camera, for example, flash illumination may be terminated too early thus resulting in a relatively dark image or photograph. Conversely, if a relatively low amount of light is reflected bask to a camera, for example, flash illumination may be terminated too late thus resulting in over-illuminated and exposed images.

In the case of the flashmatic method of flash illumination regulation, it too has problems which are not adequately addressed and which cause the generation of improperly illuminated scenes and subjects and, ultimately, improperly exposed images. That is, because the amount of illuminating light is determined based on calculating a guide number, the method is subject to erroneous measurements, calculations (e.g., rounding errors), etc. For example, range detection can be improperly measured and/or calculated, thus resulting in early or late termination of flash illumination, etc.

In order to improve on the shortcomings of the two regulation methods described above, others have proposed light regulating methods which incorporate both of the aforementioned methods into a single apparatus, Such an apparatus is proposed in Japanese Laid-Open Patent Publication No. Hei 9-105976. Unfortunately, with such a combined approach, a light source such as a flash tube may be prevented from illuminating light upon realization of an upper limit point in time or a lower limit point in time. Effective utilization of the automatic regulation technique is not achieved.

As such, the decision of camera and imaging device designers to implement one method over another to regulate flash unit output has, at best, been one that is imprecise. To combat such problems, designers have sought to refine the methods independently of each other without squarely addressing flash unit illumination output. As such, users of cameras and other imaging devices continue to run the risk of losing valuable images due to imprecise flash unit output regulation.

Thus, there exists a need to solve the aforementioned problems associated with the flash unit illumination regulation systems and methods described above. To solve such problems, new and improved systems and methods must be provided which take advantage of the benefits of such prior systems and methods and which avoid the above-stated shortcomings. To be viable such new and improved systems and methods must be able to combine both the automatic regulation and the flashmatic methods of flash unit light emission regulation into a single device that can automatically determine which method to use based subject parameters to produce the best images and photographs that are possible.

SUMMARY OF THE INVENTION

The present invention has as its principal object to solve the aforementioned problems associated with prior devices and methods used to control and regulate the amount of light emitted by electronic flash devices.

It is another object of the present invention to provide an apparatus that incorporates the advantages and allows full utilization of the automatic regulation technique and the flashmatic technique for flash device control to provide for better, more reliable flash device illumination.

It is yet another object of the present invention to incorporate both the automatic regulation method for flash device illumination control and the flashmatic method for flash device illumination control into a single apparatus that may be included within an imaging device such as a photographic camera, a separately detachable electronic flash device, etc.

These and other objects of the present invention are achieved by providing an apparatus and method for regulating and controlling the amount of light emitted by a flash unit for use with an imaging device. The apparatus and method include and involve a light source configured to illuminate a subject to imaged by an imaging device, a light receiving element configured to receive light emitted by the light source and reflected by the subject, and to generate a signal based on the reflected light, a light amount determination unit coupled to the light receiving element and configured to determine an amount of reflected light received by the light receiving element based on the signal, a light amount comparison unit coupled to the light amount determination unit and configured to compare the amount of reflected light determined by the light amount determination unit with a threshold value to generate a corresponding control signal, and a light source regulator coupled to the light amount comparison unit. The light source regulator further includes a range detector configured to detect a distance to the subject, and a guide number setting unit configured to calculate at least one guide number based on that distance and an operating parameter related to the imaging device. The calculated guide number(s) correspond to an amount of time light is to be emitted by the light source during an imaging operation. The light source regulator controls the emission of light by the light source based on the control signal and the calculated guide number(s).

BRIEF DESCRIPTION OF THE DRAWING FIGURES

The present invention is described below with reference to the following drawing figures, of which:

FIG. 6 is a timing chart corresponding to the operations performed by the circuitry depicted in FIGS. 2 and 3;

FIG. 7 is another timing chart corresponding to the operations performed by the circuitry depicted in FIGS. 2 and 3;

FIG. 9 is a chart that illustrates exemplary basic guide number characteristics according to a preferred embodiment of the present invention;

FIG. 10 is a chart that illustrates actual guide number characteristics according to a preferred embodiment of the present invention;

FIG. 12 is another diagram of an imaging device (camera) which has a detachable flash device.

DETAILED DESCRIPTION OF THE PREFERRED EMBODIMENTS

Figure 1:
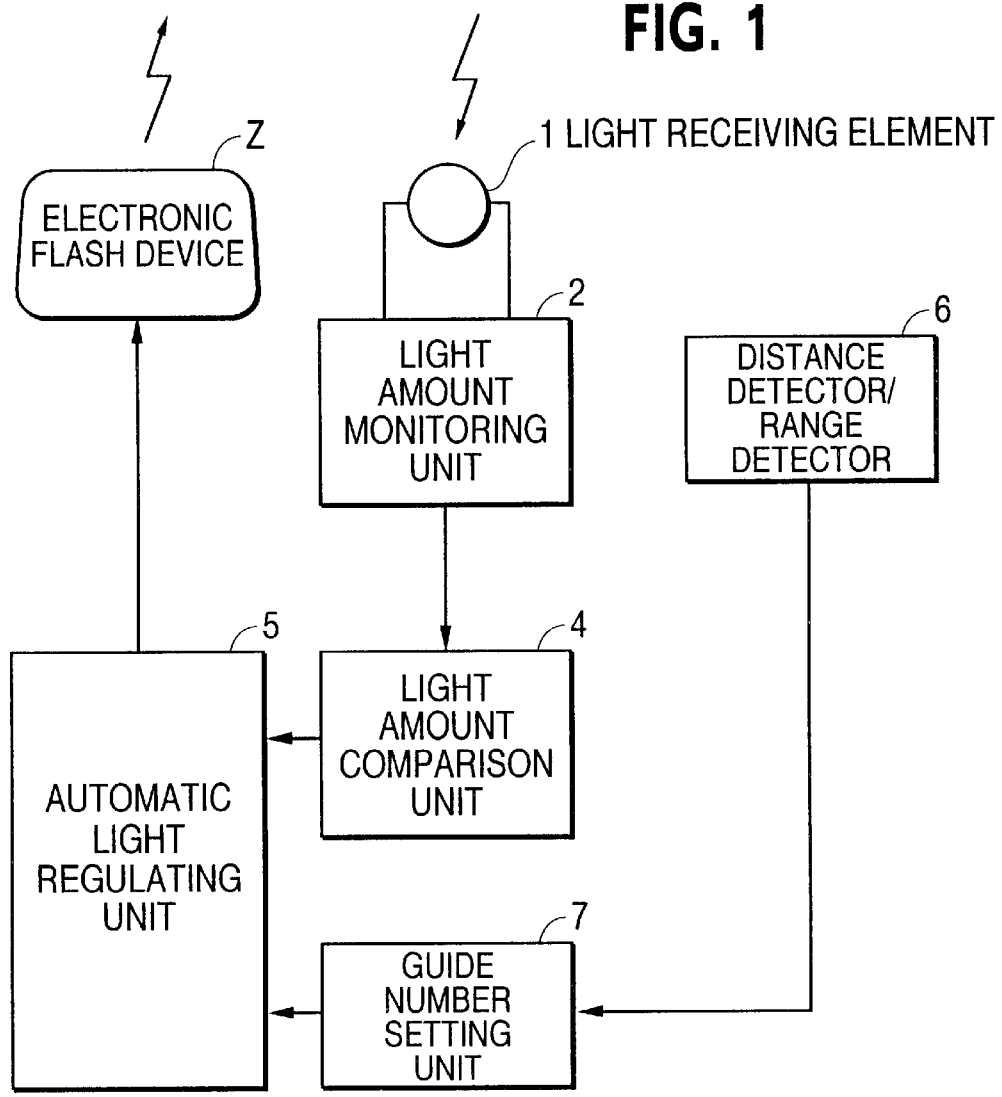
FIG. 1 is a block diagram of a system in which both the automatic light regulation method and the flashmatic regulation method have been combined to facilitate accurate flash unit control and regulation according to a preferred embodiment of the present invention.

The present invention is now discussed with reference to the drawing figures that were briefly described above. A discussion of each preferred embodiment of the present invention is followed by a corresponding discussion of its operation. Unless otherwise specified, like parts are referred to with like reference numerals.

Referring now to FIG. 1, depicted therein is a block diagram of a system for controlling and regulating flash unit illumination according to a first preferred embodiment of the present invention. In FIG. 1, it is assumed that light is generated by an electronic flash device Z which may be used at or in a camera or other imaging device. In particular, such a system includes an automatic light regulating device which is equipped with a light receiving element 1 which receives at least a portion of the light reflected by a subject to be imaged and performs photoelectric conversion in regard to the same. A light amount monitoring unit 2 operates upon the photoelectric output of light receiving element 1 to detect and determine the amount of light actually reflected by a subject. A light amount comparison unit 4 compares the amount of light detected by light amount monitoring unit 2 with a predetermined target or threshold value. An automatic light regulator 5 is arranged to control and regulate the illumination of a light source such as a flash unit tube, etc. within electronic flash device Z. Electronic flash device Z may be disposed in a camera body, in a separate flash unit arrangement, etc. (as discussed below with regard to FIGS. 4 and 12).

Light regulator 5 is includes a range detector which measures or acquires the subject range, and a guide number setting unit 7 which performs a calculation of at least one guide number based on subject range detected by range detector 6 (along with a detection error which may be realized due to mathematical rounding errors, measurement errors, etc.), and the aperture value of a camera or imaging device. Guide number setting unit 7 sets an upper limit or a lower limit (or both) of the appropriate flash time for electronic flash device Z. Light regulator 5 stops light illumination by flash device Z based on the comparison result obtained by light amount comparison unit 4 and the calculated guide number(s).

Light amount monitoring unit 2 and light amount comparison unit 4 are concerned with the automatic regulating method of light regulation control. Range detector 6, the guide number setting unit 7 are concerned with the flashmatic method of light regulation control.

The operation of the system illustrated in FIG. 1 is next described.

First, in a case that light emission stoppage by means of the automatic light regulating method does not occur, it is inferred to be a case in which a relatively dark subject/scene is being photographed. In this case, by promptly performing stoppage of light emission at the time point of the upper limit of appropriate flash time, flash photography becomes possible without negatively affecting the gradation or appearance of an exposed image.

Second, in a case that light emission stoppage by means of the automatic light regulating method occurs on reaching the lower limit of the appropriate flash time, it is inferred to be a case in which a relatively light/bright subject/scene is being photographed, In this case, by waiting until performing stoppage of light emission at the time point of the lower limit of appropriate flash time, flash photography becomes possible without negatively affecting the gradation or appearance of an exposed image.

Third, in a situation in which light emission stoppage occurs by means of the automatic light regulating method, is assumed to be that of photographing a subject of standard reflectivity. In this case, by the preferential adoption of light emission stoppage by means of the automatic light regulating method, the disadvantages originating in the flashmatic method (e.g., detection errors of the subject range and the like) are avoided.

For simplicity of the description presented above, cases have only been described which use both the upper limit and the lower limit of the appropriate flash time. The present invention is not so limited. To the contrary, light regulation control of the automatic light regulating method may be carried out by using either the upper or lower flash time.

Guide number setting unit 7 may set the flash time of electronic flash device Z as the upper limit of the appropriate flash time as an upper limit guide number Gu as shown in Equation (1):

$$\text{upper limit guide number } Gu = (R + \Delta Ru) \times F \quad (1).$$

Here $(R+\Delta Ru) \times F$, as well as taking into account the upper limit $\Delta Ru$ of the detection error, corresponds to a maximum value which the actual subject range may take. The upper limit guide number Gu is calculated by Equation (1), performing a guide number calculation using the maximum value $(R+\Delta Ru)$.

The amount of light emitted by electronic flash device Z when exceeding the upper limit guide number Gu, is not considered to be a situation where a subject possesses standard reflectivity. Instead, the case is inferred to be one in which a relatively dark subject/scene is being photographed.

In such a situation, performing light emission stoppage at the time point at which the quantity of light of the electronic flash device Z exceeded the upper limit guide number Gu, will result in accurate flash photography.

Guide number setting unit 7 may set the flash time of the electronic flash device Z as the lower limit of the appropriate flash time as a lower limit guide number Gd as shown in Equation (2):

$$\text{lower limit guide number } Gd = (R - \Delta Rd) \times F \quad (2)$$

Here $(R-\Delta Ru)$, as well as taking into account the lower limit $(-\Delta Rd)$ of the detection error, corresponds to a minimum value which the actual subject range may take. The lower limit guide number Gd is calculated by Equation (2), performing a guide number calculation using the minimum value $(R-\Delta Rd)$.

A situation such that the light emission stoppage occurs by means of the automatic light regulating method prior to the light emission quantity of the electronic flash device Z reaching lower limit guide number Gd, is not considered to be one where a subject is of standard reflectivity. Accordingly, the case is inferred that a relatively bright subject/scene is being photographed.

In such a case, by means of waiting until the light emission quantity of the electronic flash device Z reaches the lower limit guide number Gd and then performing light emission stoppage, accurate flash photography becomes possible.

Normally, in a photographic optical system, it is possible to find the subject range (precisely, the distance to the focus position) based on actual observation of the lens position and the like. Measurement errors related to subject range are governed by the measurement accuracy of the lens position measurement mechanism and the like disposed in the photographic optical system. Because of this, measurement errors of the subject range consist of a characteristic numerical value according to the kind of photographic optical system.

Consequently, the characteristic detection error of the photographic optical system in actual use can be accurately obtained by the direct acquisition of data about detection errors via data communication with the photographic optical system. Accordingly, based on the photographic optical system actually in actual use, it is possible to accurately find the upper limit and lower limit of the appropriate guide number.

Alternatively, guide number setting unit 7 can estimate the detection error of the subject range based on the value of the focal distance of the photographic optical system. Normally, as the focal distance of the photographic optical system becomes short, the amount of extension of the lens becomes small, and the measurement error of the subject range, found from the lens extension amount, becomes large.

Consequently, the measurement error of the subject range can be estimated, based on the focal distance of the photographic optical system actually in use.

By means of such an estimate of the detection error, it becomes possible, to appropriately change over between flash photography by means of the automatic light regulating method, and flash photography by means of the flashmatic method.

Figure 2:
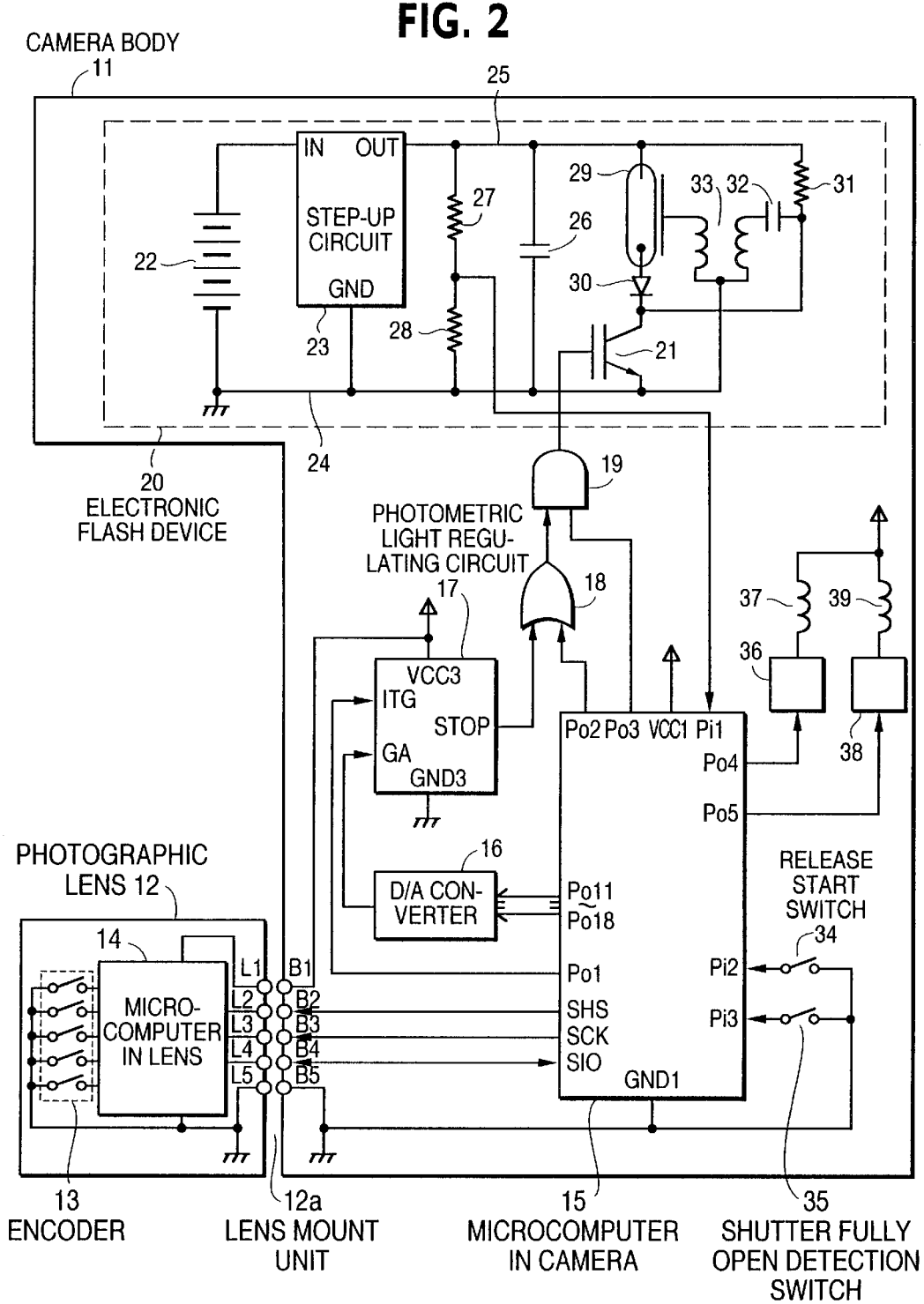
FIG. 2 is a diagram of a circuit according to a first preferred embodiment of the present invention.

Referring now to FIG. 2, depicted therein is a diagram of a circuit according to a first preferred embodiment of the present invention. In particular, a photographic lens 12 is mounted on the lens mount unit 12a of a camera body 11. An encoder 13 is located within photographic lens 12 and is used to detect the position of a focus lens (not shown) within photographic lens 12. The output terminal of encoder 13 is connected to a microcomputer 14 which is disposed within photographic lens 12.

The communication ports of in-lens microcomputer 14 are respectively connected, via connection points L2–4 of the lens and connection points B2–4 of the camera at the lens mount unit 12a, to communication ports SHS, SCK, SIO of the in-camera microcomputer 15 which is disposed within the camera body 11.

Moreover, a power supply voltage is supplied from the camera to the lens via camera contact points B1, B5 and lens contact points L1, L5 of the lens mount 12a.

The output ports Po11–18 of in-camera microcomputer 15 are connected via a D/A converter 16 to the GA terminal of a light regulating circuit 17. Moreover, the output port Po1 of in-camera microcomputer 15 is connected to the ITG terminal of the light regulating circuit 17.

The STOP signal output from light regulating circuit 17 is supplied to an OR gate 18. A signal from output port Po2 of microcomputer 15 is also supplied to OR gate 18.

The signal output from OR gate 18 is supplied to an AND gate 19. A signal from output port Po3 of microcomputer 15 also is supplied to AND gate 19.

The output signal of AND gate 19 is supplied to the gate of an IGBT 21 (Insulated Gate Bipolar Transistor) within the electronic flash device 20/Z.

The IN terminal of a step-up circuit 23 is connected to the positive pole of a battery 22 of electronic flash device 20. The negative pole of battery 22 is connected to the GND terminal 23 of step-up circuit 23, and constitutes a ground line 24.

The battery voltage in a stepped-up state is output from the OUT terminal of step-up circuit 23, and is supplied to power supply line 25.

A main capacitor 26 stores the stepped-up voltage and is connected between power supply line 25 and the ground line 24. The two sides of main capacitor 26 are connected to voltage divider resistors 27 and 28 in order to divide a charging voltage. The junction of voltage divider resistors 27 and 28, is connected to the A/D conversion input port Pi1 microcomputer 15, Moreover, one terminal of a light emitting tube 29, and one terminal of a resistor 31, are connected to the power supply line 25. The other terminal of the light emitting tube 29 is connected to the anode of a diode 30.

The collector of the IGBT 21, the cathode of the diode 30, and the terminal of one side of a trigger capacitor 32, are connected to the other terminal of the resistor 31. The emitter of IGBT 21 is connected to ground line 24.

The other terminal of the trigger capacitor 32 is connected via the primary winding of a trigger transformer 33 to ground line 24. On the other hand, one terminal of the secondary winding of the trigger transformer 33 is connected to a trigger electrode disposed in the tube wall of the light emitting tube 29. The other terminal of the secondary winding is connected to ground line 24.

A release start switch 34, which goes ON corresponding to depression of a camera release button, for example, is connected to the input port Pi2, provided with a pull-up resistor, of microcomputer 15. A shutter fully open detection switch 35, which goes ON when the shutter is fully open, is connected to the input port Pi3.

A front blind stopping magnet 37 is connected via an interface 36 to the output port Po4 of microcomputer 15. A rear blind stopping magnet 39 is connected via an interface 38 to the output port Po5.

Stopping magnets 37, 39 are provided in order to individually stop the front blind and rear blind of the shutter.

Figure 3:
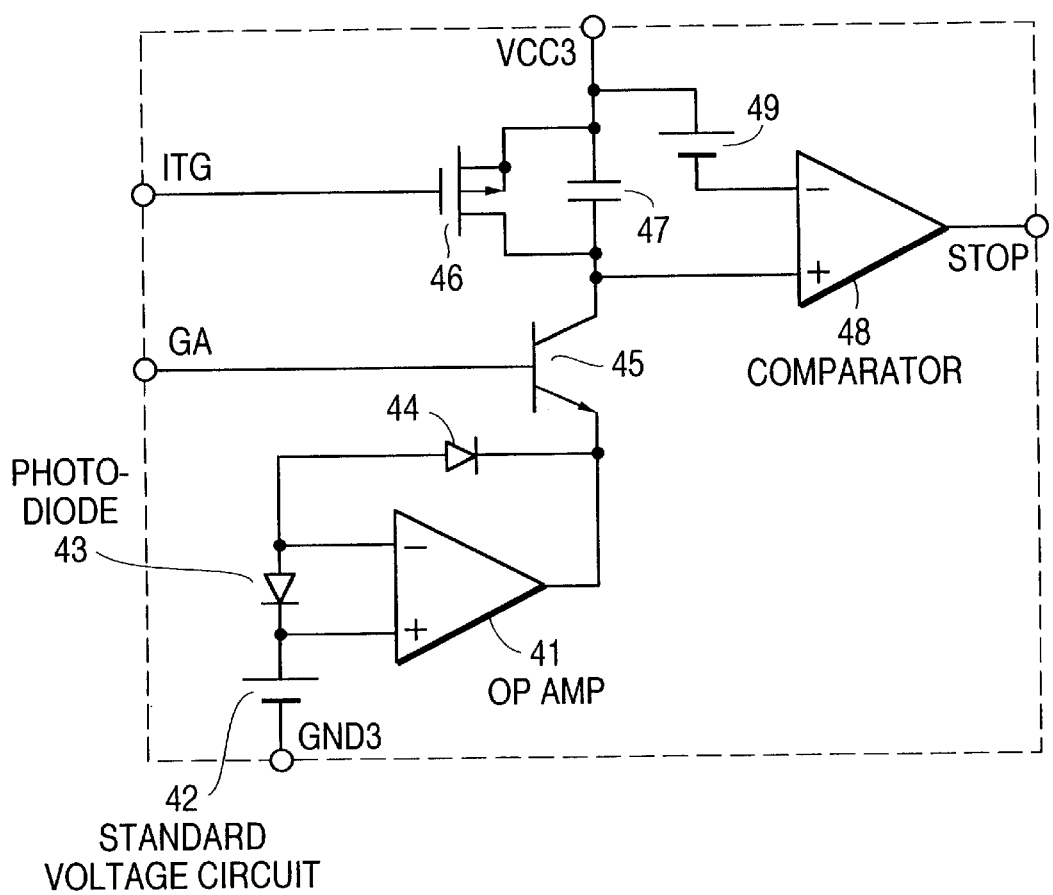
FIG. 3 is a circuit diagram of the light regulating circuit depicted in FIG. 2.

Referring now to FIG. 3, depicted therein is a diagram which shows an exemplary circuit of light regulating circuit 17.

In FIG. 3, a reference voltage (corresponding to a threshold amount of light which can be detected) is applied via a reference voltage circuit 42 to the non-inverting input terminal of an op-amp 41. Moreover, the cathode of a photodiode 43 is also connected to the non-inverting input terminal.

On the other hand, the anode of the photodiode 43 and the anode of a diode 44 are connected to the inverting input terminal of op-amp 41.

Figure 4:
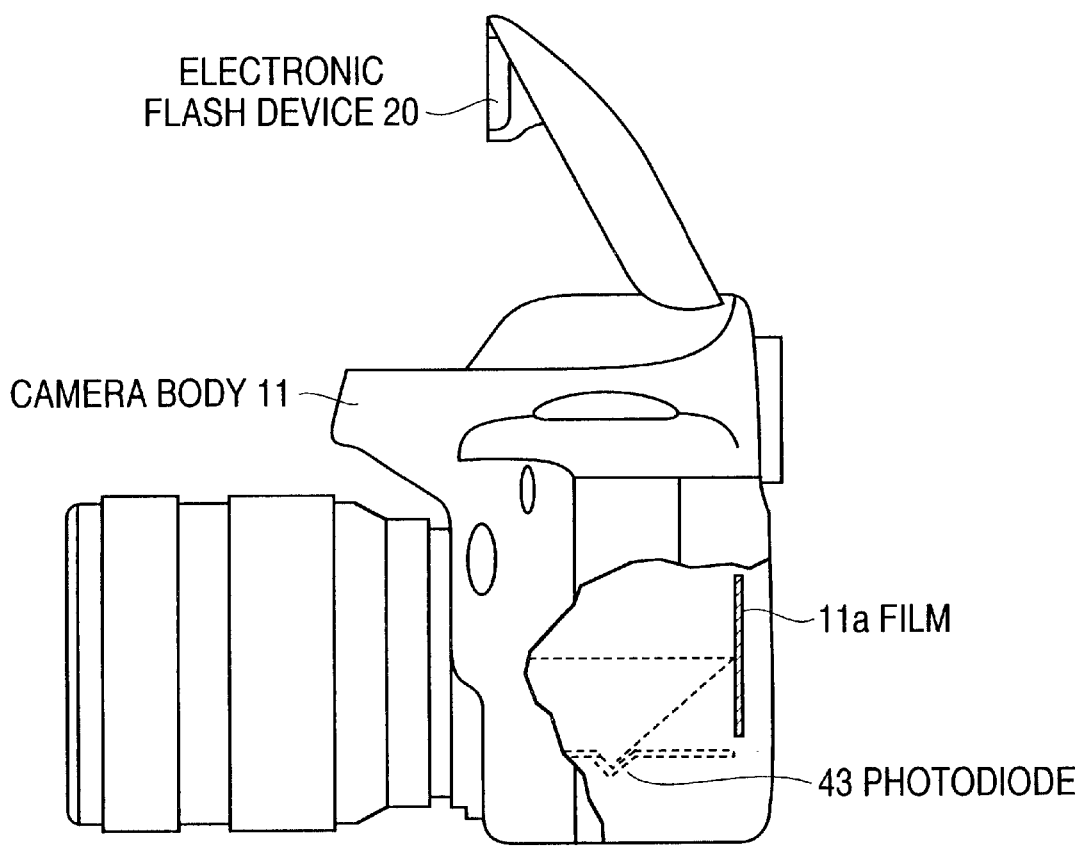
FIG. 4 is a diagram of an imaging device that includes the circuitry illustrated in FIGS. 2 and 3.

Photodiode 43 is located, as shown in FIG. 4, in the lower portion of a mirror box of the camera body 11, and receives diffusely reflected light at the time the film 11a is exposed. Such light is reflected from a subject/scene to be imaged/photographed. During such an exposure operation, light regulating circuit evaluates and monitors such reflected light and determines its intensity relative to a standard threshold corresponding to a standard voltage.

The cathode of diode 44 is connected to the output of op-amp 41 and to the emitter of a transistor 45.

The output voltage of D/A converter 16 (FIG. 2) is supplied via the GA terminal to the base of transistor 45.

On the other hand, the drain of an FET 46, one terminal of a capacitor 47, and the non-inverting input of a comparator 48 are connected to the collector of transistor 45.

The output voltage output from port Po1 of the microcomputer 15 (FIG. 2) is supplied via the ITG terminal to the gate of this FET 46.

Additionally, the source of the FET 46 and the other terminal of the capacitor 47 are connected to voltage supply VCC3. Furthermore, a reference voltage is supplied via a reference voltage circuit 49 to the inverting terminal of the comparator 48.

The output signal of capacitor 48 is connected via a STOP terminal to the first input terminal of OR circuit 18 (FIG. 2).

Referring now to FIG. 4, depicted therein is an imaging device that includes the circuitry depicted in FIGS. 2 and 3. In particular, electronic flash device 20 is shown as being integrally disposed in a portion of camera body 11. Accordingly, when flash photography, for example, is desired or required by automatic processes within the camera illustrated in FIG. 4, in-camera microcomputer 15 (FIG. 2) may control the amount of flash illumination emitted by electronic flash device 20 to effect a properly exposed image on a film substrate 11a.

Figure 5:
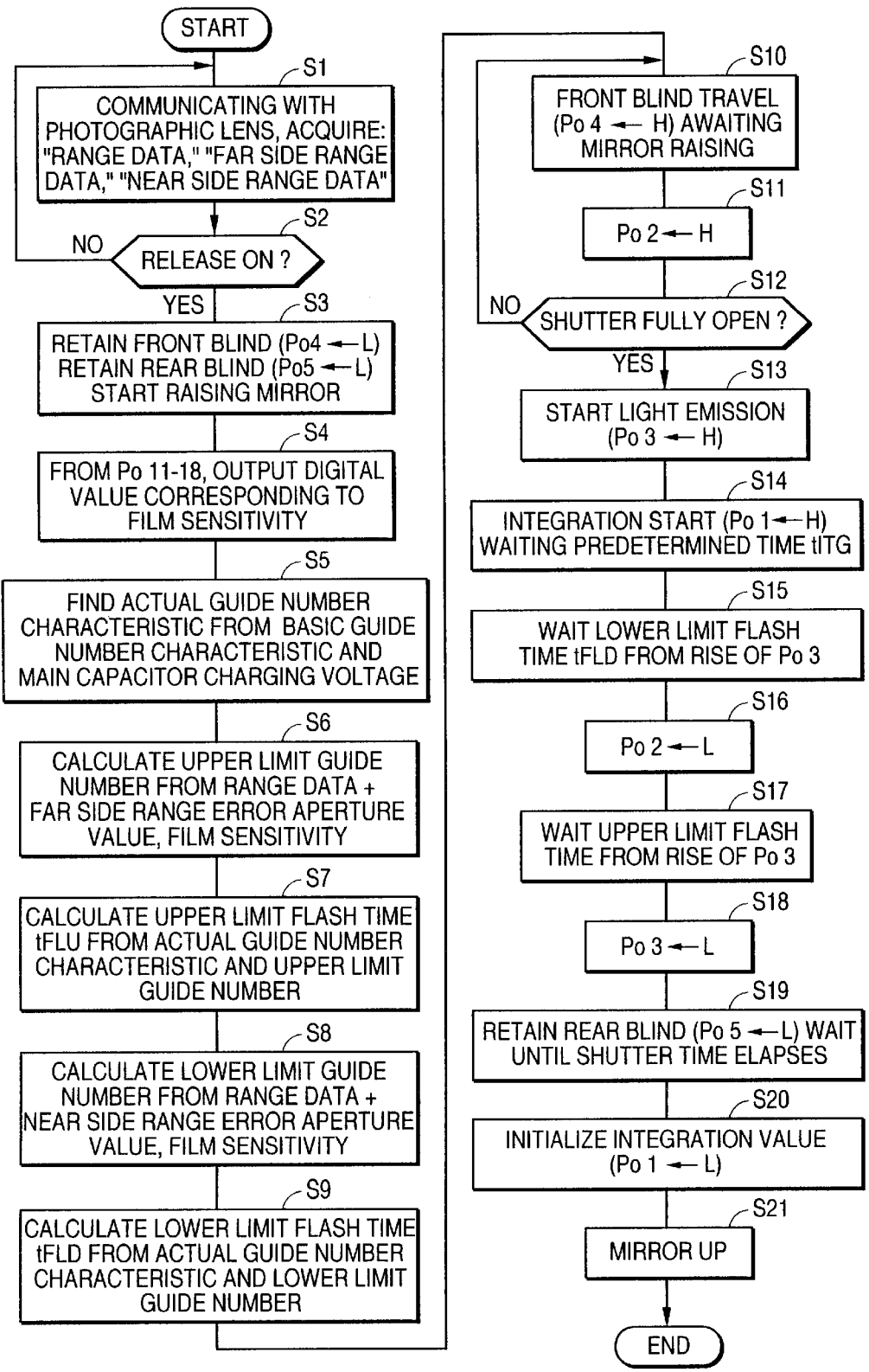
FIG. 5 is a flowchart that illustrates the operations performed by the circuitry depicted in FIGS. 2 and 3.

The operation of the preferred embodiment illustrated in FIGS. 2–4 is next described with regard to FIGS. 5–7 to which reference is now made.

FIG. 5 is a flow diagram which illustrates the operation of the first mode of embodiment.

FIG. 6 is a timing chart of data communication between the in-camera microcomputer 15 and the in-lens microcomputer 14.

FIG. 7 is a timing chart of the operation of the camera.

Accordingly, when the main power supply is introduced to the camera body 11, in-camera microcomputer 15 performs serial data communications as illustrated in FIG. 6.

In particular, in-camera microcomputer 15 sets communication port SHS to the low level and commences serial data communications with in-lens microcomputer 14.

Next, in-camera microcomputer 15, while outputting a synchronizing clock pulse from the communication port SCK, sends from the communication port SIO a command code requiring data relating to subject range. The command code sent in this manner is received by the in-lens microcomputer 14 via a connection point of the lens mount 12a.

In-lens microcomputer 14, after the command code has been decoded, detection of the lens position is carried out using encoder 13. Using lens position and the focal distance of the photographic lens 12, in-lens microcomputer 14 calculates the subject range (distance from the camera body 11 to the focus position, for example).

Next, in-lens microcomputer 14 reads out the far side range error data and near side error data which are stored in an internal ROM, for example. Such data depend on the measurement accuracy of encoder 13 and the focal distance, and are data which are preset based on observation or well known statistical calculations.

In-lens microcomputer 14 sends the range data R, far side range error data ΔRu, and near side range error data ΔRd serially to the communication port SIO as synchronized by clock pulses from the in-camera microcomputer. In-camera microcomputer 15 receives, in succession, the data which are sent in this manner (FIG. 5, S1).

After the end of such data communication, in-camera microcomputer 15 determines the switch state (FIG. 5. S2) of the release starting switch 34.

In the case that the release starting switch 34 is in the OFF state (FIG. 5, NO side of S2), in-camera microcomputer 15 determines that the release button has not yet been pressed, and returns the operation to S1.

On the other hand, in the case that the release starting switch 34 was changed to the ON state (FIG. 5, YES side of S2), in-camera microcomputer 15 proceeds to the photographic operations stated next.

First, in-camera microcomputer 15 maintains the front blind stopping magnet 37 and the rear blind stopping magnet 39 in the state with current flowing, thus retaining the front blind and rear blind of the camera shutter. In this state, the rise is commenced of the quick return mirror (not shown in the drawing) (FIG. 5, S3).

Furthermore, in-camera microcomputer 15, equipped for automatic light regulating control of the electronic flash device 20 according to the present invention, outputs from the output ports Po11–18, a digital value according to the film sensitivity (FIG. 5, S4). This digital value is applied, via D/A converter 16 which converts it to an analog voltage, to the GA terminal of the light regulating circuit 17. The applied voltage of the GA terminal sets the gain of the light quantity/amount detection operation, as described next.

Next, in-camera microcomputer 15 reads in, from the AND conversion input port Pi1, the divided voltage due to the voltage divider resistors 27, 28, detecting the charging voltage Vmc of the main capacitor 26.

In-camera microcomputer 15 finds the actual guide number characteristic by correcting the basic guide number characteristic previously stored in internal ROM according to the detected value of this charging voltage (FIG. 5, S5).

A description with a specific example will be given here as regards the relationship of the basic guide number characteristic and the actual guide number characteristic is now provided with regard to FIGS. 8(a) and 8(b).

Figure 8A:
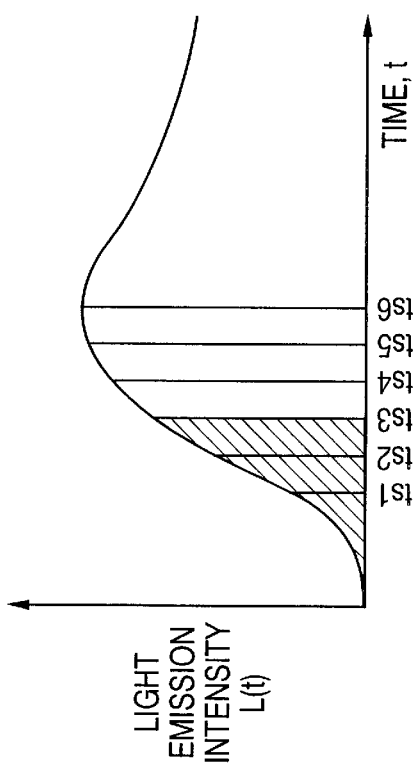
FIGS. 8A and 8B are graphs that illustrate the time change of the light emission intensity L.

In particular, FIG. 8(a) is a graph which shows the light emission intensity L of the light emitting tube 29 at a time of full charge. At this time, the time integral value (area under the sloping line) of the light emission intensity L corresponds to the light emission quantity or amount of the light emitting tube 29.

The basic guide number characteristic shown in FIG. 9 gives the relationship between the quantity/amount of light, converted to a guide number value, and the corresponding flash time.

Figure 8B:
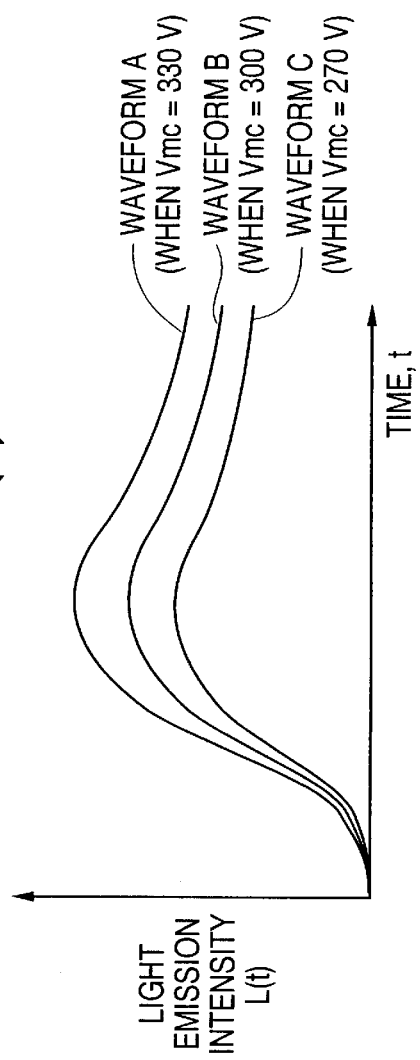

However, as shown in FIG. 8(b), the light intensity L of the light emitting tube 29 changes according to the charging voltage Vmc of the main capacitor 26.

The guide number GN' actually obtained in the case of a charging voltage Vmc can be calculated using:

$$GN'=GN \times Vmc/VM \qquad (5)$$

Where: GN is the value of the basic guide number, and VM is the value of the charging voltage when the basic guide number characteristic was actually observed.

For example, when VM is taken as 330 V and Vmc as 272.7 V, the above Equation (5) becomes:

$$GN'=GN' \times 0.826 \qquad (6)$$

The actual guide number characteristic data shown in FIG. 10 are those obtained when a correction calculation which used Equation (6) was carried out for the basic guide numbers shown in FIG. 9.

Continuing such a correction calculation of the guide number characteristic data, in-camera microcomputer 15 calculates the upper limit guide number Gu by means of the guide number calculation of the flashmatic method as follows (FIG. 5, S6);

$$Gu=(R+\Delta Ru) \times F \qquad (1)$$

Where: R is the subject range, $\Delta Ru$ is the far side range error, and F is the aperture value of the camera.

Incidentally, in the case of a film sensitivity Sv5 (corresponding to a film with ISO rating 100), rewriting Equation (1) using the standard upper limit guide number $GU_{Sv5}$ and the sensitivity Sv of the film used, $$Gu_{Sv5}=(R+\Delta Ru) \times F \times 2^{(Sv-5)/2} \qquad (7)$$

is obtained.

After the upper limit guide number Gu has thus been found using Equation (1) or Equation (7), in-camera microcomputer 15, referring to the actual guide number characteristic data, finds the flash time tFLU which corresponds to the upper limit guide number Gu (FIG. 5, S7).

Because the guide number characteristic data are a series of discrete data, they are not necessarily data which coincide. In such a case in which there is no coincidence, data relevant to before and after the upper limit guide number Gu are sought from the guide number characteristic data. Next, linearly interpolating the flash times corresponding to these data, an accurate flash time tFLU may be found.

Next, in-camera microcomputer 15 calculates the lower limit guide number Gd by a flashmatic method guide number calculation as follows:

$$Gu=(R-\Delta Rd) \times F \qquad (2)$$

Where: R is the subject range, $\Delta Rd$ is the near side range error, and F is the aperture value of the camera.

In the case of a film having sensitivity Sv5 (corresponding to a film having an ISO rating of 100), rewriting Equation (2) using the standard lower limit guide number $Gd_{Sv5}$ and the sensitivity Sv of the film used, $$Gd_{Sv5}=(R-\Delta Rd) \times F \times 2^{(Sv-5)/2} \qquad (8)$$

is obtained.

After the lower limit guide number Gd has been found using Equation (2) or Equation (8), in-camera microcomputer 15, referring to the actual guide number characteristic data, finds the flash time tFLD which corresponds to the lower limit guide number Gd (FIG. 5, S9).

Next, in-camera microcomputer 15, after it has waited for the end of raising the mirror, sets the output port Po4 to the high level, canceling the current flow to the front blind stop magnet 37 and causing commencement of the travel of the front blind of the shutter (FIG. 5, S10).

Next, in-camera microcomputer 15 sets the output port Po2 to the high level, altering the output of the OR circuit 18 to the high level (FIG. 5, S11).

In this state, in-camera microcomputer 15 waits for complete opening of the shutter via the shutter fully open switch 35 (FIG. 5, S12).

When it is confirmed that the shutter is fully opened, in-camera microcomputer 15 sets the output port Po3 to the high level, thus sending the output of the AND gate 19 to the high level (FIG. 5, S13).

As a result, the gate voltage of the IGBT 21 becomes high, and current flows between the collector and emitter of the IGBT 21. As such, the voltage of the main capacitor is applied to the light emitting tube 29. At this time, the charge which has been charged into the trigger capacitor 32 is discharged instantaneously via the primary winding of the trigger transformer 33, and a high voltage is generated in the secondary winding side of the trigger transformer 33.

The high voltage generated in the aforementioned manner excites the gas within the light emitting tube 29 via the trigger electrode. As a result, the internal resistance of the light generating tube 29 suddenly falls, and discharge commences of the charge of the main capacitor 26. Due to such a discharge, a flash of light is generated from the light emitting tube 29.

Accordingly, in in-camera microcomputer 15, in order to prevent noise accompanying the flash commencement, after waiting a slight predetermined time, tlTG sets the output port Po1 to the high level (FIG. 5, S14).

As a result, FET 46 changes to the non-conducting state, and collector current of the transistor 45 on the capacitor 47 side begins to flow.

A brief description is given below regarding the collector current value of the transistor 45 within regulating circuit 17.

First, the inverting input of the op-amp 41 is in a short state with respect to the non-inverting input, and is maintained equal to the standard voltage of the standard voltage circuit 42. In this state, the photocurrent which occurred in the photodiode 43 flows to the output terminal side of op-amp 41 via diode 44. At this time, a voltage which is the standard voltage of the standard voltage circuit 42 is reduced by the voltage of the two terminals of the diode 44 and is output at the output terminal of the op-amp 41.

In the case that the applied voltage of the GA terminal (voltage of the base of transistor 45) has temporarily been made equal to the standard voltage of the standard voltage circuit 42, the base-emitter region of transistor 45 and diode 44 constitute a current mirror circuit. As a result, a current about equal to the photo-current flows through diode 44, and is extracted as collector current from transistor 45.

Moreover, in the case that the applied voltage of the GA terminal deviates from the standard voltage of standard voltage circuit 42, the voltage of the offset portion is superposed on the base-emitter region of the transistor 45. Because the I-V characteristic of the base-emitter region is a logarithmic relationship, the current in an amount which multiplied the photocurrent by a gain constant which depends on the offset voltage portion is extracted as collector current of transistor 45.

By way of such a collector current charging capacitor 47, both terminals of the capacitor 47 give rise to a charging voltage corresponding to the received light quantity/amount of the photodiode 43.

The charging voltage of capacitor 47 instantaneously exceeds the standard voltage of the standard voltage circuit 49, reversing the output of the comparator 48 and drops the STOP terminal to the low level.

On the other hand, in-camera microcomputer 15, from the rise time point of the output port Po3, waits until the lower limit flash time tFLD found in step S9 has elapsed (FIG. 5, S15).

During this waiting period (period c-e shown in FIG. 7), because the output port Po2 is maintained at the high level regardless of the output of the STOP terminal, the conductive state of the IGBT 21 persists. Because of this, the flash light emission of the light emitting tube 29 does not stop.

When the lower limit flash time tFLD elapses, the in-camera microcomputer 15 sets the output port Po2 to the low level (FIG. 5, S16).

As a result, the output level of the STOP terminal is transmitted to the gate of the IGBT 21 via the OR gate 18 and the AND gate 19.

In a case in which the STOP terminal has already changed to the low level (i.e., a threshold value has been detected by photodiode 43) the IGBT 21 while lagging, changes to the non-conductive state, and the light emitting tube 29 is extinguished.

In such a state, in-camera microcomputer 15, from the rise time point of the output port Po3, waits until the upper limit flash time tFLU, found in step S6, elapses (FIG. 5, S17).

In the case that the STOP terminal has fallen to the low level during this waiting period (period e-g in FIG. 7) (e.g., such as during photographic operations in very or relatively bright circumstances), the IGBT 21 changes to the non-conductive state at the time point of this fall, and the light emitting tube 29 promptly extinguishes.

Here, when the upper limit flash time tFLU elapses, in-camera microcomputer 15 drops the output port Po3 to the low level (FIG. 52 S18).

As such, because of such operation, even if the STOP terminal is at the high level, the output of the AND circuit 19 is forcedly set to the low level. As a result, the IGBT 21 is certain to become in the non-conductive state, and the light emitting tube 29 is caused to stop illuminating light.

Next, in-camera microcomputer 15, in order for slow synchro exposure or rear blind synchro exposure and the like, after waiting for a predetermined shutter time to elapse, canceling the current of the rear blind stop magnet 39, causes commencement of rear blind travel (FIG. 5, S19).

In such a state, in-camera microcomputer 15 drops the output port Po1 to the low level and, causing FET 46 to conduct, resets the charging voltage of the capacitor 47 (FIG. 5, S20).

After travel of the rear blind has ended, in-camera microcomputer 15 lowers the mirror, and a sequence of flash photography ends (FIG. 5, S21).

By means of the operations described above, in a case that the STOP terminal fell to the low level before the amount of light of the light emitting tube 29 reaches the lower limit guide number Gd, light emission is not stopped until the light emission amount reaches the lower limit guide number Gd. Accordingly, even with a comparatively light or bright subject, flash photography becomes possible to accurately expose images and the like.

Moreover, in a case that the STOP terminal did not fall to the low level before the amount of light of the light emitting tube 29 exceeds the upper limit guide number Gu, the circuitry in FIG. 2 performs light emission stoppage at the time point that the light emission quantity of the light emitting tube 29 exceeded the upper limit guide number Gu. Accordingly, even with photography of a relatively dark subject, accurate flash operations and photography become possible.

Furthermore, in a case in which the STOP terminal fell, with the light emission quantity of the light emitting tube 29, in a state positioned between the lower limit guide number Gd and the upper limit guide number Gu, light emission stoppage is performed simultaneously with the fall of the STOP terminal. In such a situation, it is inferred to be a case of photographing a subject of standard reflectivity and in which appropriate flash photography becomes possible.

Moreover, in the first mode of embodiment, because detection error data is directly acquired via data communication with the photographic lens 12, the detection error characteristic of the photographic lens 12 which is actually in use can be accurately obtained. Accordingly, it is possible to find the appropriate upper limit guide number Gu and lower limit guide number Gd, while flexibly responding to the interchangeable use of many kinds of lenses, etc.

Figure 11:
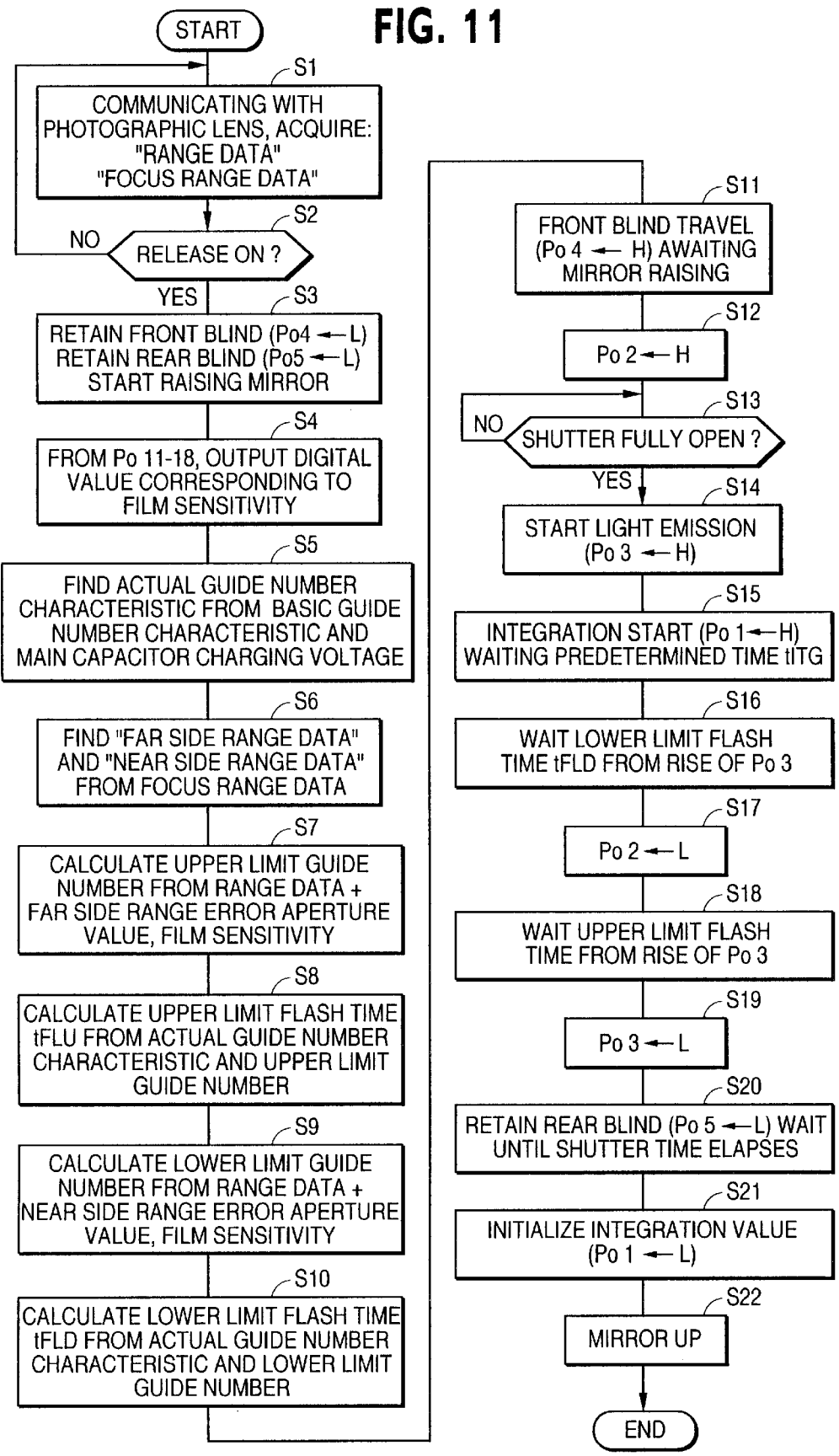
FIG. 11 is a flowchart that illustrates the operation of a second preferred embodiment of the present invention.

Another preferred embodiment of the present invention is next described with regard to the flow chart illustrated in FIG. 11. The operations depicted in FIG. 11 are intended to be carried out with the structures mentioned above. However, instead of computing guide numbers based on complex calculations, guide numbers are determined and calculated based on table entries and lookups to determine upper and lower flash times.

In particular, FIG. 11 illustrates a flow chart that shows the operations of a second preferred embodiment of the present invention. Key aspects of the present preferred embodiment are: (1) in-camera microcomputer 15 acquires subject range data and focal distance data via data communication with in-lens microcomputer 14 (FIG. 11, S1), (2) in-camera microcomputer 15, based on the detected focal distance data, and referring to a previously established data table, finds the far side range error data and the near side range error data (FIG. 11, S6), and (3) in-camera microcomputer 15 calculates the upper limit flash time tFLU and the lower limit flash time tFLD, performing guide number calculations by the flashmatic method, using the subject range data, far side range error data, and near side range error data (FIG. 11, S7–S10).

Because operations other than these are the same as in the first preferred embodiment as described above, similar effects can also be obtained. Moreover, with the present preferred embodiment it is possible to control and regulate flash device emission based on the present invention in conjunction with prior art devices and systems. Furthermore, in the preferred embodiments discussed above, subject ranges are detected based on lens position. The present invention, however, is not so limited. For example, range finding by triangulation, light wave measurement, and any other like method may be used.

In particular, in many photographic optical systems, data communication of focal distance is already performed for other purposes. Accordingly, if the automatic light regulating device of the present invention is included within a prior art type camera, the present invention may take advantage of already calculated focal distance values to estimate guide numbers and the like to facilitate dual method flash device control operations as provided by the present invention.

Referring now to FIG. 12, depicted therein is an imaging device (e.g., a camera) that may include the circuitry depicted in FIGS. 2 and 3, for example. In particular, an electronic flash device is shown as being removeably mounted on a conventional hot-shoe mounting plate which is disposed on a portion of camera body 11. Accordingly, when flash photography, for example, is desired or required by automatic processes within the camera illustrated in FIG. 12, an in-camera microcomputer 15 (FIG. 2) may control the amount of flash illumination emitted by the electronic flash device to effect a properly exposed image on a film substrate 11a. Alternatively, the apparatus provided by the present invention may be placed completely in the flash device to facilitate corresponding flash control operations as described herein. Alternatively, if the camera depicted in FIG. 12 is one that is at least partially automatic, signals related to lens focal length may be communicated to flash regulation disposed within the flash device via the hot-shoe connection to facilitate guide number calculation and estimation. In any case, in FIG. 12, a flash device regulation device may be disposed within a flash device regardless of the capabilities of the camera on which such flash device is operatively mounted. Accordingly, a new flash device is provided by the present invention that may be used to retrofit existing camera outfits to provide enhanced flash device control to realize better photographs and images.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. Apparatus for regulating the amount of light emitted by a flash unit for use with an imaging device, comprising:
    a light source configured to illuminate a subject to be imaged by an imaging device;
    a light receiving element configured to receive light emitted by said light source and reflected by the subject to be imaged, and to generate a signal based on said reflected light;
    a light amount determination unit coupled to said light receiving element and configured to determine an amount of said reflected light received by said light receiving element based on said signal;
    a light amount comparison unit coupled to said light amount determination unit and configured to compare said amount of reflected light determined by said light amount determination unit with a threshold value to generate a corresponding control signal; and
    a light source regulator coupled to said light amount comparison unit and configured to regulate the amount of light emitted by said light source, said light source regulator including a range detector configured to detect a distance to the subject and a range error associated with calculating said distance to the subject, and a guide number setting unit configured to calculate at least one guide number based on said distance to the subject to be imaged, said range error, and an operating parameter related to the imaging device, said at least one guide number corresponding to an amount of time light is to be emitted by said light source during an imaging operation to be performed by said imaging device, said light source regulator controlling the emission of light by said light source based on said control signal and said at least one guide number.

2. The apparatus according to claim 1, wherein said light source is a flash light source used for flash imaging operations such as flash photography.

3. The apparatus according to claim 1, wherein said imaging device is a film-based camera.

4. The apparatus according to claim 1, wherein said amount of time light is to be emitted by said light source corresponds to an upper limit amount of time said light source will be permitted to emit and said guide number setting device calculates said at least one guide number based on the equation:

$$\text{Upper Limit Guide Number } G_u = (R + \Delta R_u) \times F,$$

where: R is said distance detected by said range detector,
    $\Delta R_u$ is the maximum calculation error which can be realized by said range detector in detecting said distance, and
    F is said operating parameter.

5. The apparatus according to claim 4, wherein said operating parameter is an aperture value corresponding to said imaging device.

6. The apparatus according to claim 1, wherein said operating parameter is an aperture value corresponding to said imaging device.

7. The apparatus according to claim 1, wherein said amount of time light is to be emitted by said light source corresponds to a lower limit amount of time said light source will be permitted to emit and said guide number setting device calculates said at least one guide number based on the equation:

$$\text{Lower Limit Guide Number } G_d = (R - \Delta R_u) \times F,$$

where: R is said distance detected by said range detector,
    $-\Delta R_u$ is the minimum calculation error which can be realized by said range detector in detecting said distance, and
    F is said operating parameter.

8. The apparatus according to claim 1, wherein said guide number setting unit acquires said distance via communication with an optical system of said imaging device.

9. The apparatus according to claim 1, wherein said guide number setting unit estimates detection errors based on a focal distance of an optical system of said imaging device.

10. An apparatus for regulating the amount of light emitted by a flash unit for use with an imaging device, comprising:

a light source emitting light to facilitate operations of an imaging device;

means for determining if an amount of light emitted by said light source and reflected by a subject to be imaged corresponds to a threshold value and for generating a first control signal based on said determination;

means for generating at least one guide number corresponding to at least one amount of time that said light source is permitted to emit light and for generating a second control signal corresponding to said at least one amount of time that said light source is permitted to emit light, said at least one guide number is based on a distance to said subject to be imaged, a range error associated with calculating said distance to said subject to be imaged, and an operating parameter related to said imaging, device; and means for regulating said light Source based on said first and second control signals.

11. The apparatus according to claim 10, wherein said light source is a flash unit.

12. The apparatus according to claim 10, wherein said imaging device is a photographic camera.

13. The apparatus according to claim 10, wherein said operating parameter is an aperture value pertaining to said imaging device.

14. The apparatus according to claim 10, wherein said operating parameter is a focal length of an optical system of said imaging device, said means for generating estimating said at least one guide number based on said focal length.

15. A camera, comprising:

a light source emitting light to facilitate imaging operations;

means for receiving light emitted by said light source;

means for determining if an amount of light emitted by said light source and reflected by a subject to be imaged received by said receiving means corresponds to a threshold value and for generating a first control signal based on said determination;

means for generating at least one guide number corresponding to at least one amount of time that said light source is permitted to emit light and for generating a second control signal corresponding to said at least one amount of time that said light source is permitted to emit light, said guide number based on a distance to said subject to be imaged, a range error associated with calculating said distance to said subject to be imaged, and an operating parameter related to said imaging device; and means for controlling said light source based on said first and second control signals.

16. The camera according to claim 15, wherein said light source is an electronic flash device.

17. The camera according to claim 15, wherein said operating parameter is an aperture value.

18. The camera according to claim 15, wherein said operating parameter is a focal length of an optical system, said means for generating estimating said at least one guide number based on said focal length.

19. A method for controlling a light source during imaging operations, comprising the steps of:

causing a light source to emit light to facilitate imaging operations of an imaging device;

receiving light emitted by said light source;

determining if an amount of light emitted by said light source and reflected by a subject to be imaged corresponds to a threshold value and generating a first control signal based on said determination;

generating at least one guide number corresponding to at least one amount of time that said light source is permitted to emit light and generating a second control signal corresponding to said at least one amount of time that said light source is permitted to emit light, said guide number based on a distance to said subject to be imaged, a range error associated with calculating said distance to said subject to be imaged, and an operating parameter related to the operation of said imaging device; and controlling said light source based on said first and second control signals.

20. The method according to claim 19, wherein said light source is a flash unit.

21. The method according to claim 19, wherein said receiving step is performed by a photosensitive device, said photosensitive device generating a signal which is compared against said threshold value during said determining step.

22. The method according to claim 19, wherein said operating parameter is an aperture value corresponding to an aperture of said imaging device.

23. The method according to claim 19, wherein said at least one guide number generated during said generating step includes an upper limit guide number corresponding to an upper limit amount of time that said light source is permitted to emit light.

24. The method according to claim 19, wherein said at least one guide number generated during said generating step includes a lower limit guide number corresponding to a lower limit amount of time that said light source is permitted to emit light.

25. The method according to claim 19, wherein said at least one guide number generated during said generating step includes an upper limit guide number corresponding to an upper limit amount of time that said light source is permitted to emit light, and a lower limit guide number corresponding to a lower limit amount of time that said light source is permitted to emit light.

26. An electronic flash device for use with an imaging device, comprising:

a light source emitting light to facilitate imaging operations by an imaging device;

means for receiving light emitted by said light source;

means for determining if an amount of light emitted by said light source and reflected by a subject to be imaged as received by said receiving means corresponds to a threshold value and for generating a first control signal based on said determination;

means for generating at least one guide number corresponding to at least one amount of time that said light source is permitted to emit light and for generating a second control signal corresponding to said at least one amount of time that said light source is permitted to emit light, said guide number based on a distance to said subject to be imaged, a range error associated with calculating said distance to said subject to be imaged, and an operating parameter related to said imaging device; and means for controlling said light source based on said first and second control signals.

27. The electronic flash device according to claim 26, wherein said operating parameter is an aperture value.

28. The electronic flash device according to claim 26, wherein said operating parameter is a focal length of an optical system of said imaging device, said means for generating estimating said at least one guide number based on said focal length.

29. The electronic flash device according to claim 26, wherein said imaging device is a camera.

30. The electronic flash device according to claim 26, wherein said means for receiving light is a photosensitive device, said photosensitive device generating a signal which is compared against said threshold value by said means for determining.

* * * * *